United States Patent Office 3,530,710
Patented Sept. 29, 1970

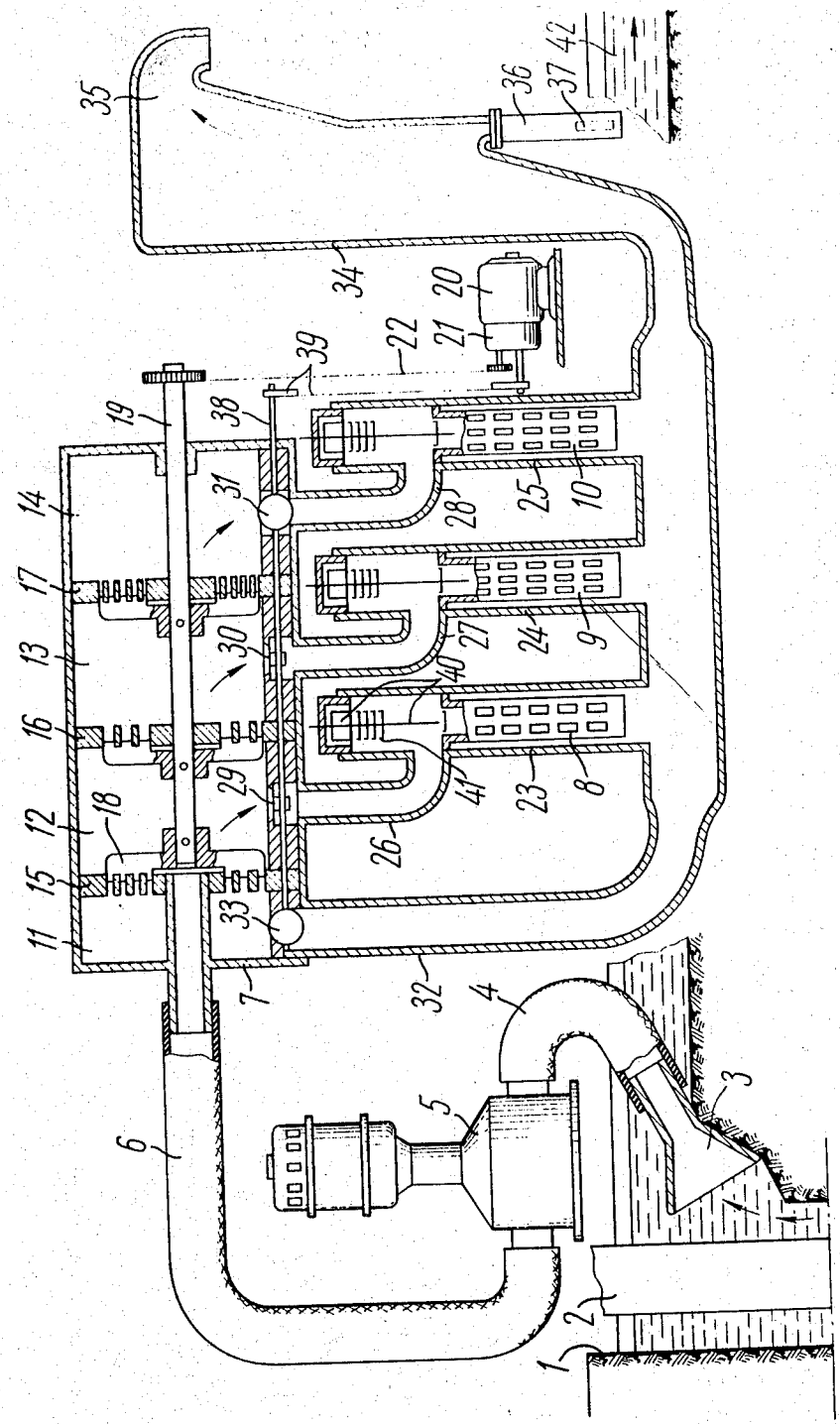

3,530,710
APPARATUS FOR THE CONTINUOUS WITH-
DRAWAL OF SLUDGE DURING THE MUD
LOGGING OF WELLS
Georgy Ivanovich Beloglazov, Ul. Mikhailovskaya 26, kv. 5; Lev Izrailevich Pomerants, Sirenevy bulvar 29/45, korp. 2, kv. 29; Sergei Grigorievich Komarov, Ul. Kazakova 3, kv. 64; Nikolai Nikolaevich Gerasimov, 2 Donskoi proezd 9b, kv. 1; Boris Yakovlevich Kudymov, 3 Kozhukhovskaya ul. 7, kv. 215; Sergei Nikolaevich Schukin, 3 Tverskaya-Yamskaya 40/39, kv. 13; and Nikolai Nikolaevich Kvashnin, Ul. Timiryazevskaya 8, kv. 61, all of Moscow, U.S.S.R.
Filed Oct. 22, 1968, Ser. No. 769,620
Int. Cl. E21b 49/02
U.S. Cl. 73—153                    3 Claims

ABSTRACT OF THE DISCLOSURE

An apparatus for continuous withdrawal of sludge during the mud logging of wells in which the sludge is separated into groups of particles in a sludge-sorting chamber divided into sections by filtering grids, the sludge having been sorted out into groups of particles being accumulated in mesh containers.

---

The present invention relates to apparatus for industrial and geochemical prospecting of wells and, more particularly, to apparatus for continuous withdrawal of sludge (pieces of rock carried by the mud from the bottom to the top of the well being drilled) during the mud logging of wells for plotting the cross section of the well and detecting and evaluating the producing horizons.

The known apparatus for continuous withdrawal of sludge during the mud logging of wells are designed for complex extraction of the whole spectrum of the sludge particles and they are provided with a conveyer and a hopper in the ditch system of the derrick. Such apparatus does not ensure accurate observation of the sludge at the actual depths (the depths of occurrence of the rock, the withdrawn sludge being the product of destruction thereof).

Impossibility of accurate observation of the sludge at the actual depths during the complex withdrawal of the whole spectrum of the sludge particles results from the fact that groups of particles of various dimensions owing to the sedimentation process, principally defined by Stokes law, have different travelling speeds as compared with the velocity of the mud carrying the sludge to the well head. As a consequence, the groups of coarser particles of the sludge lag behind the groups of finer particles in the course of their travel from the bottom to the well head so that the coarser particles reach the well head together with the groups of the finer particles of some deeper beds, overtaking the groups of the coarser particles on the way to the well head.

Mixing of various size particles of the sludge during their travel in the annular space together with the mud results in a situation in which each withdrawn portion of the sludge consists of pieces of rocks belonging to different depths of occurrence. This rules out the possibility of marking the withdrawn portion of the sludge with a definite interval of the actual depths to a sufficient accuracy and makes the information received through the testing of the sludge irrelevant.

A significant disadvantage of the apparatus heretofore known is the presence in the withdrawn portion of the sludge, not only of the sludge proper (pieces of the rock being prospected), but also of pieces of the top-laying rocks (sandstone, clay, etc.) getting into the bottom hole or into the mud during its travel from the bottom to the top of the well due to caving of falling rocks from the uncased parts of the well.

The above-mentioned disadvantages exclude the possibility of using the withdrawn sludge for plotting the lithological and stratigraphic cross section of the well.

Furthermore, the operation of the known apparatus is associated with unavoidable losses of the bedded fluid. These losses are explained by the fact that the withdrawal of the sludge is carried into effect with the help of a bunker and a conveyer washed with water so that the sludge being withdrawn is subjected to a prolonged contact with the atmosphere. This results in a partial volatilization of the gas phase of the bedded fluid and washing-out of its liquid phase which leads to depreciation of the withdrawn sludge making it useless for studying the characteristics of the bedded fluid of the reservoir intersected by the well.

An object of the invention is to provide an apparatus for continuous withdrawal of sludge during the mud logging of wells which ensures the marking of the withdrawn portion of the sludge with the actual depths of the well.

Another object of the invention is to provide an apparatus for continuous withdrawal of sludge during the mud logging of wells which makes it possible to separate the face rocks from the falling rocks.

Still another object of the invention is to provide an apparatus for continuous withdrawal of sludge during the mud logging of wells which provides for obtaining information about the character of saturtaion of reservoirs intersected by the well the condition of the bedded fluid in the reservoirs.

According to these and other objects, the apparatus for continuous withdrawal of sludge during the mud logging of wells comprises a device for extraction of the pulp and a device for separation and accumulation of the sludge, both devices being interconnected, wherein, according to the invention, the device for the separation and accumulation of the sludge comprises a sludge-sorting chamber in the form of a cylinder divided into sections by filtering grids, in the direction of travel of the sludge, for sorting the sludge into groups depending on the size of the particles, and a plurality of mesh containers for accumulation of the sludge having been sorted into groups in the above chamber. For this purpose, the mesh sizes of the containers successively decrease in passage sections and are equal to the passage sections of the corresponding grids, the containers being connected with the respective sections of the sludge-sorting chamber through branch pipes with shutters coupled to the control system of the mud logging station for admitting the sludge, having been sorted out into groups of particles, from the chamber sections into the containers according to a time program.

In order to indicate the interval of the actual depths of the well from which the sludge has been withdrawn, each of the mesh containers is provided with a device consisting of an electromagnetic gate with a set of marking washers to be dropped into the container upon reaching a predetermined interval of true depths.

For collecting the filtered particles of the sludge, the device for separation and accumulation of the sludge is preferably connected to an arrangement in the form of a dynamic sedimentation cone with a sampling cup.

The device which achieves the above-mentioned objects makes it possible to carry out the plotting of the lithological and stratigraphic cross section of the well by the sludge, and thereby to increase the efficiency of geological documentation of the prospected wells.

Other objects and advantages of the present invention will become more fully apparent from a consideration of a preferred embodiment of the invention taken in conjunction with the accompanying drawing which shows in the single figure a schematic arrangement of the proposed apparatus including a longitudinal section of the device for separation and accumulation of the sludge.

The proposed apparatus includes a device for extraction of the pulp from the annular space of the well (the space between wall 1 of the well and the drilling tool 2) and a device for separation and accumulation of the sludge, both devices being interconnected.

The device for extraction of the pulp from the annular space includes a conical bell 3, an inlet hose 4, a pump 5 and an outlet hose 6 for supplying the pulp into the device for separation and accumulation of the sludge. The device for separation and accumulation of the sludge comprises a sludge sorting chamber 7 and mesh containers 8–10 for accumulation of the particles of the sludge having been sorted into groups in the chamber 7, the mesh of the containers having successively decreasing passage sections of holes for collection of groups of sludge particles of a definite size in the containers 8–10.

The sludge-sorting chamber 7 is made in the form of a water-tight cylinder divided into sections 11–14 connected through annular filtering grids 15–17 with successively-decreasing passage sections of grid holes for sorting the sludge into groups with respect to the size of the particles, which sections are equal in size to the passage sections of the mesh of the containers 8–10. The sections 12 and 13 are equipped with comb brushes 18 mounted on a shaft 19 driven in rotation by an electric motor through a reduction gear 21 and a coupling mechanism 22.

The containers 8–10 are arranged in discharge lines 23–25 connected to the corresponding sections 12–14 of the chamber 7 through branch pipes 26–28 equipped with shutters 29–31.

The lines 23–25 communicate with a by-pass line 32, one end of which is connected to the section 11 of the chamber 7 through a shutter 33 and the other end of which is connected to a device for collecting the filtered particles of the sludge, which device consists of a dynamic sedimentation cone 34 with an outlet throat 35. The cone 34 has a sampling cup 36 equipped with an electric heater 37.

The shutters 29–31 and 33 are mounted on a shaft 38 driven by the electric motor 20 through the reduction gear 21 and a coupling mechanism 39.

Each of the containers 8–10 is provided with a device for indication of the interval of the actual depths of the well from which the sludge has been withdrawn. This device consists of an electromagnetic gate 40 with a set of marking washers 41 dropped one by one into each of the containers 8–10 upon reaching a predetermined interval of the actual depths.

The passage sections of the mesh holes are such as to provide for detention of the groups of the sludge particles of the appropriate size in the containers 8–10. In order to damp the flow of the mud in the containers 8–10 and provide for successive accumulation of the sludge particles in the chronological sequence of their delivery, the flow of mud carrying the sludge particles is admitted into the containers 8–10 from the branch pipes 26–28 in a direction tangential to the walls of the containers 8–10.

The apparatus operates as follows.

The pulp supplied to the well head, prior to its contact with the atmosphere is trapped by the conical bell 3, fed through the hose 4 to the pump 5 and then via the outlet hose 6 is fed into the water-tight sludge-sorting chamber at a constant volumetric velocity.

The quantity of groups into which the sludge is divided depends on a predetermined accuracy of observation of the sludge with the actual depths as well as on the density of the mud and the rocks being met in the course of drilling the well. Practically, this quantity may amount to any value. The apparatus herein described is adapted for division of sludge into four groups: the first group consists of the particles which travel simultaneously with the mud and have a diameter (the largest size of the particles) equal approximately to 1.5 mm.; the second group consists of the particles with a diameter of 2–3 mm.; the particles of the third group have a diameter of 3.5–4.5 mm. and the fourth group consists of particles about 5 mm. in diameter.

The grid 16 has a passage section of holes suitable for passing the particles of the first, second and third groups of the sludge (in the instant case with $d<5$ mm.). Consequently, separation of the particles of the fourth group of the sludge takes place in the section 12 of the chamber 7, and the separated particles are accumulated at the input of the branch pipe 26 which is normally closed by the shutter 29. The particles of the first, second and third groups of the sludge are fed into the section 13 of the chamber 7 through the grid 16.

The grid 16, limiting the section 13 mm. at the other side, has a passage section of holes suitable for passing the particles of the first and second groups of the sludge (in the instant case with $d<3.5$). Therefore, the particles of the third group are separated in section 13 and accumulated at the input of the branch pipe 27 normally closed by the shutter 30. The particles of the first and second groups of the sludge pass through the grid 17 and are fed into section 14 of the chamber 7.

Thus, the particles of the first and second groups of the sludge are separated in the section 14 and fed into the container 10 through the branch pipe 28 with the normally open shutter 31.

The section 11 of the chamber is not a sorting chamber and is intended for preliminary enrichment of the supplied pulp, as well as for compensation of the variable consumption of the pulp in separate parts of the apparatus resulting from periodic closing of the branch pipes 26–28. Thus, this section serves as a hydraulic damper providing for discharge of excessive liquid phase of the pulp containing no specified particles of the sludge, the liquid phase being discharged through the normally open shutter 33 and the by-pass line 32.

The grid 15 disposed between the sections 11 and 12 of the chamber 7 has a passage section of the holes of a minimum size and is located at the rear part of the flow of the pulp entering the chamber 7. Since circulation of the pulp through this grid is directed against the motion of the main pulp flow, a hydrodynamic process of straight-flow separation of the solid phase is started in the chamber of the adjacent section 12. Therefore, the section 11 and the by-pass line 32 are supplied with the mud carrying only fine non-filtering suspensions having a low moment of inertia of translational motion.

In order to provide efficient operation of the sludge-sorting chamber 7, the annular grids 15–17 are continuously cleaned of sludge particles by the rotary comb brushes.

Usually, during the operation of the apparatus, only the shutters 31 and 33 are normally open. As a consequence, the particles of the third and fourth groups of the sludge are accumulated in the sections 12 and 13, whereas the mud with the particles of the first and second groups of the sludge is fed from the section 14 into the container 10 through the branch pipe 28 whose shutter 31 is opened.

The container 10 has a passage section of mesh holes suitable for passing the particles of the first group of the sludge (in this case with $d<1.5$ mm.). Therefore, the mud and the particles of the first group of the sludge are admitted into the by-pass line 32 through the line 25, while the particles of the second group of the sludge are progressively accumulated in the container 10.

In order to provide the travel of the fourth and third groups of the sludge, having been accumulated in the sections 12 and 13 of the chamber 7, according to a predetermined time program (for example, every 5 minutes), the shutters 31 and 33 are closed and the shutters 29 and 30 are opened for a short period of time (e.g.

15–20 seconds) in response to the signals sent from the mud logging station (not shown on the drawing). In this case, the mud together with the sludge particles are supplied from the sections 12 and 13 into the containers 8 and 9 through the branch pipes 26 and 27.

The container 9 has a passage section of mesh holes suitable for passing the particles of the first group of the sludge and accidental particles of the second group of the sludge (in the present case with $d<3$ mm.). Therefore, the mud and the particles of the first and second groups of the sludge are supplied into the by-pass line 32 through the line 24, while the particles of the fourth group of the sludge are progressively accumulated in the container 9.

The container 8 has a passage section of mesh holes suitable for passing the particles of the first group of the sludge and accidental partciles of the second and third groups of the sludge (in the present case with $d<4.5$ mm.). Therefore, the mud and the particles of the first and third groups of the sludge are fed to the by-pass line 32 through the line 23, while the particles of the fourth group of the sludge are progressively accumulated in the container 8.

When the shutters 29, 30, and 31, 33 are set to the initial position (closed and opened, respectively) the operation of the apparatus is repeated in the above-described sequence.

When drilling a well, the control system of the mud logging station sends signals of the true depths at predetermined intervals (for example, at 1 meter of sinking) to operate separately for each group of the sludge the electromagnetic gate 40 so that the marking washer 41 is dropped into the corresponding containers 8–10 to limit the portion of the sludge associated with a predetermined interval of the actual depth of the sludge withdrawn therefrom.

The extraction of the filtered particles of the first group of the sludge is effected in the dynamic sedimentation cone 34 fed with the mud through the containers 8–10, the section 11 and the by-pass line 32.

In the dynamic sedimentation cone 34 the mud travels upwardly from the narrow to the wider portions of the cone. The fine particles of the first group of the sludge lose their momentum of translational motion and begin to lag behind the liquid phase which is discharged into the derrick ditch 42 through the throat 35 as fast as the passage section of the cone 34 increases and the velocity of fluid drops.

The sedimentary particles of the first group of the sludge settle in the sampling cup 36. In order to exclude the possibility of jellification of the pulp in the cup 36 when the apparatus is inoperative or when drilling the well with the aid of viscous mud, the pulp is subjected to forced convection by means of an electric heater 37.

Through definite intervals of the depths, which are usually equal to the length of one stand of the drilling tool, the containers 8–10 and the cup 36 filled with the sludge are removed from the apparatus and replaced with new ones.

Tests have shown that in the range of the rock densities up to 3 g./cu. cm. and those of mud up 2 g./cu. cm., the withdrawal of the sludge particles is the above mentioned groups makes it possible to ascertain the sludge relative to the true depths with an accuracy of up to 10%. This helps in the establishment of the lithological and stratigraphic columns by using the sludge withdrawn by the proposed apparatus.

The invention is not limited to the embodiment above dscribed, and changes and modifications may be made in the details of construction and arrangement of parts without departing from the scope of the present invention.

These changes and modifications are to be considered as falling within the scope of the invention as defined by the following claims.

What is claimed is:

1. An apparatus for the continuous withdrawal of sludge during the mud logging of wells, said apparatus compromising first means for withdrawal of pulp from a well, second means connected to said first means for separation and accumulation of sludge from the pulp supplied thereto, a sludge-sorting chamber in the form of a cylinder arranged in said second means, filtering grids dividing said chamber into sections and having successively decreasing passage sections of holes in the direction of travel of the sludge for sorting the sludge into groups of particles by size, a plurality of mesh containers for accumulation of the sludge sorted into groups in said chamber, said containers having successively decreasing passage sections of mesh holes equal in size to the passage sections of the holes of corresponding grids, branch pipes connecting each of said containers with a corresponding section of said chamber, and shutters arranged in said branch pipes for admitting the sludge sorted into groups of particles from said sections into said containers through said branch pipes.

2. An apparatus according to claim 1, wherein each of said containers includes means for indicating the interval of the actual depths of thc well from which the sludge has been withdrawn, which means includes an electromagnetic gate with a set of marking washers dropped one by one into said container upon reaching a predetermined interval of the actual depths.

3. An apparatus according to claim 1 comprising third means connected with said second means for collection of the filtered particles of the sludge, said third means comprising a dynamic sedimentation cone with a sampling cup.

References Cited

UNITED STATES PATENTS

| | | | |
|---|---|---|---|
| 2,295,437 | 9/1942 | Thompson | 73—153 X |
| 2,749,748 | 6/1956 | Slobod et al. | 73—153 |

JERRY W. MYRACLE, Primary Examiner

U.S. Cl. X.R.

73—422; 175—46; 210—89, 414